Patented Nov. 15, 1949

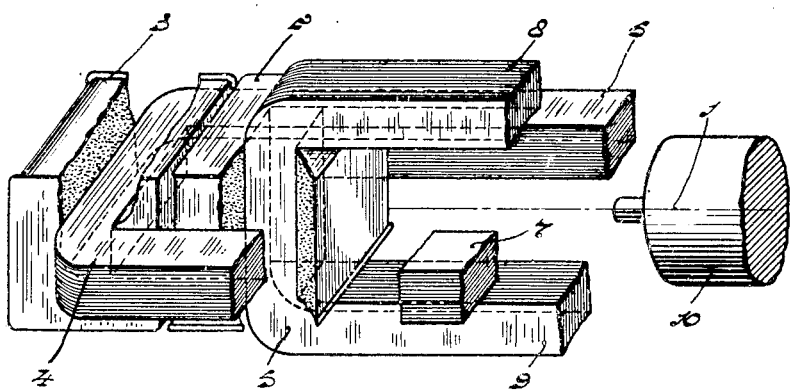

2,487,846

UNITED STATES PATENT OFFICE 2,487,846

MOTOR FOR DRY-SHAVING APPARATUS

Willem Frederik Boelsums, Eindhoven, Netherlands, assignor, by mesne assignments, to Hartford National Bank and Trust Company, Hartford, Conn., as trustee Application May 21, 1946, Serial No. 671,174
In the Netherlands, May 21, 1941

Section 1, Public Law 690, August 8, 1946
Patent expires May 21, 1961

3 Claims. (Cl. 172—36)

This invention relates to an electric machine for hand apparatus, more particularly a motor for dry-shaving apparatus or the like and is characterized by at least two stator windings having U-shaped pole cores, the stator windings being located one behind the other in the direction of the rotor shaft and the unwound limbs of the pole core extending in the direction of the rotor shaft.

In electric machines having a small size, more particularly machines which should be conveniently accommodated to the hand such as dry-shaving apparatus, hereinafter called "hand-apparatus," one is faced by the problem in using two or more windings how to lodge the windings in the machine in conjunction with the requirement of a minimum diameter of the apparatus with a given power and consequently with a given diameter of the rotor.

The present invention provides an extremely suitable solution in this respect, since a minimum diameter of the apparatus can be associated with comparatively as large as possible diameter of the rotor. In practice the length of the apparatus increased at the cost of the diameter is not experienced as a drawback, since this length does not or substantially not exceed the usual longitudinal dimensions of such hand-apparatus.

The invention permits more particularly the practical use of a condenser motor for the said purpose, which motor, as is well-known, is possessed of a coil directly connected to the mains and a coil connected to the mains through the intermediary of a condenser for the obtainment of the necessary rotary field. In regard to the motors hitherto used having a wound rotor and a collector having brushes the condenser motor is endowed with the well-known advantages of a great simplicity, working security and little maintenance cost. This motor has never been used for the above mentioned purposes, since the minimum power implies such a large diameter of the rotary squirrel armature that the above condition of easy handling could not be satisfied to a sufficient degree. This drawback is obviated by the invention as a result of which the above mentioned unmistakable advantages of the condenser motor can be fully utilized.

According to another feature of the invention the wound yoke parts of the pole cores are shifted with respect to one another in the direction of the periphery of the rotor over the same angle as the unwound limbs which permits the use of flat U-shaped pole cores. This will be more fully explained by reference to the accompanying drawing.

In one form of construction of the invention the coils are shaped as cubes having substantially the same contents whereby the length of the apparatus is reduced to a minimum at the given diameter.

The sole figure represents one executional example of a construction according to the invention in the form of a part of a stator circuit of a condenser motor for driving a dry-shaving apparatus.

The construction includes two stator windings 2 and 3 which are located one behind the other in the direction of the rotor shaft 1 and have U-shaped pole cores 4 and 5 whose unwound limbs 6, 7 and 8, 9 respectively extend in the direction of the rotor shaft 1. By this expedient the diameter of the housing of the machine, which includes the limbs 6 to 9, can be kept as small as possible with respect to the required minimum diameter of the rotor 10. In general sufficient space is available for providing the motor condenser, which is rolled up to a thin-walled cylinder, between the housing and the limbs 6 to 9.

The rotor is of the normal type of squirrel cage armature and for a suitable field distribution the limbs 6 to 9 may generally be equipped with pole shoes (not represented in the drawing), which may, for instance, be united to form a closed ring.

The wound yoke parts of the U-shaped pole cores 4 and 5 are axially shifted with respect to one another in the direction of the periphery of the rotor over the same angle, viz. 90°, as the unwound limbs 6, 7 and 8, 9 with respect to each other so that, as appears from the drawing, flat U-shaped pole cores can be used.

When realizing the coils in the form of cubes having the same contents the assembly obtained is as compact as possible and the motor has a relatively small length.

In a practical model of a condenser motor for a dry-shaving apparatus the required power amounted to 2.5 watts, it being possible to give the rotor a diameter of 18 mm. and the housing of the hand apparatus an outer diameter of 43 mm., the length of the whole shaving apparatus inclusive of the shaving head amounting to 115 mm.

What I claim is:

1. An electric motor comprising a rotor member and a shaft for said rotor, a first substantially U-shaped core member, a first stator coil positioned on the yoke of said first core member, a second substantially U-shaped core member, a second stator coil positioned on the yoke of said second core member, said stator coils being positioned one behind the other in the direction of the said rotor shaft, the unwound portions of the said cores extending in the direction of the said rotor shaft and surrounding said rotor, and the unwound portions of one of the said cores being peripherally displaced with respect to the unwound portions of the other of said cores.

2. An electric motor comprising a rotor member and a shaft for said rotor, a first substantially U-shaped core member, a first stator coil positioned on the yoke of said first core member, a second substantially U-shaped core member, a second stator coil positioned on the yoke of said second core member, said stator coils being positioned one behind the other in the direction of the said rotor shaft, the unwound portions of the said cores extending in the direction of the said rotor shaft and surrounding said rotor, and the unwound portion of one of the said cores being peripherally displaced approximately 90° electrically with respect to the unwound portions of the other of said cores 3. An electric motor comprising a rotor member and a shaft for said rotor, a first substantially U-shaped core member, a first cube-shaped stator coil positioned on the yoke of said first core member, a second substantially U-shaped core member, a second cube-shaped stator coil positioned on the yoke of said second core member, said stator coils being positioned one behind the other in the direction of the said rotor shaft, the unwound portions of the said cores extending in the direction of the said rotor shaft and surrounding said rotor, and the unwound portions of one of the said cores being peripherally displaced with respect to the unwound portions of the other of the said cores.

WILLEM FREDERIK BOELSUMS.

REFERENCES CITED

The following references are of record in the file of this patent:

UNITED STATES PATENTS

| Number | Name | Date |
| --- | --- | --- |
| 2,219,552 | Andis | Oct. 29, 1940 |
| 2,347,870 | Amdur | May 2, 1944 |